United States Patent [19]

Golem

[11] 4,434,051
[45] Feb. 28, 1984

[54] MULTIPLE VALVE APPARATUS FOR SIMULATED MOVING BED ADSORPTION PROCESSES

[75] Inventor: Michael W. Golem, Palatine, Ill.

[73] Assignee: UOP Inc., Des Plaines, Ill.

[21] Appl. No.: 385,590

[22] Filed: Jun. 7, 1982

[51] Int. Cl.³ .............................................. B01D 15/00
[52] U.S. Cl. ..................................... 210/264; 55/224; 55/386; 210/277
[58] Field of Search .................... 210/264, 277, 278; 55/179, 224, 387

[56] References Cited

U.S. PATENT DOCUMENTS

| | | | |
|---|---|---|---|
| 649,610 | 5/1900 | Jewell | 210/264 X |
| 3,040,777 | 6/1962 | Carson et al. | 137/625.15 |
| 3,169,110 | 2/1965 | Rubelick | 210/278 X |
| 3,192,954 | 7/1965 | Gerhold et al. | 137/625.11 |
| 3,201,491 | 8/1965 | Stine et al. | 55/31 X |
| 3,291,726 | 12/1966 | Broughton | 208/310 |
| 3,510,423 | 5/1970 | Neuzil et al. | 208/310 |
| 3,761,533 | 9/1973 | Otani et al. | 585/802 |
| 4,155,846 | 5/1979 | Novak et al. | 210/264 X |
| 4,157,267 | 6/1979 | Odawara et al. | 127/46.2 |

FOREIGN PATENT DOCUMENTS

1598201 8/1970 France ........................ 210/264
4709179 4/1979 Japan .

*Primary Examiner*—John Adee
*Attorney, Agent, or Firm*—James R. Hoatson, Jr.; John F. Spears, Jr.; William H. Page, II

[57] ABSTRACT

An apparatus is disclosed which is useful in simulating the countercurrent flow of several fluid streams through a bed of solid contact material such as a selective adsorbent. The apparatus comprises a plurality of multi-port valves and is used to direct the flow of different streams into and out of a fixed bed of material at points which are periodically changed. The invention arises in the arrangement of the valves, which minimizes the number of required valves and also minimizes the undesired admixture of different streams in the process lines connecting the contacting bed to the main fluid transfer lines. The valves are arranged in three tiers, with the first tier having sets of valves arranged in series flow and the second tier having sets of valves arranged in parallel. The third tier of valves directs flows between two adjacent fluid feed or withdrawal conduits entering the contacting bed.

26 Claims, 3 Drawing Figures

MULTIPLE VALVE APPARATUS FOR SIMULATED MOVING BED ADSORPTION PROCESSES

FIELD OF THE INVENTION

The invention relates to apparatus used to direct the flow of vapor or liquid streams into and out of a fluid-solids contacting zone. The invention is directly concerned with the transfer of different liquid streams into an out of a fixed bed of a solid adsorbent at a number of places, with the point of liquid addition or withdrawal of each stream being periodically changed to simulate the movement of the total adsorbent bed. The invention is specifically directed to a multi-valve apparatus able to direct the flows of feed, desorbent, extract and raffinate streams in a simulated moving bed adsorptive separation process.

PRIOR ART

Adsorptive separation processes using a valve means to change the location at which a feed and a desorbent stream enter a mass of adsorbent and the two points at which the raffinate stream and the extract separately leave the adsorbent are well known and used commercially to perform several separations. One of the most successful of these processes utilizes what is referred to in the specific art as a "rotary valve." This device is similar to a complex multi-port stopcock having four or more main flow lines which may be connected to any one of about 8 to 40 other lines leading to specific points in the adsorbent bed. Processes utilizing a rotary valve in a simulated moving bed adsorption process are described in U.S. Pat. Nos. 3,201,491 and 3,291,726. The rotary valve itself is described in U.S. Pat. Nos. 3,040,777 and 3,192,954.

It has been recognized in the art that a multi-valve manifold could be used as a replacement for a rotary valve in such a process. This is taught for instance in U.S. Pat. No. 3,510,423 at column 3, line 57, but the reference does not describe such valve arrangements with any specificity.

Multi-valve systems for use in adsorptive separation processes are shown in FIGS. 3A and 3B of U.S. Pat. No. 3,761,533 and FIGS. 3A-3B of U.S. Pat. No. 4,157,267. The latter reference discloses the use of three-way valves at column 4, line 15. Another multi-valve arrangement for this purpose is disclosed in Japanese Public Disclosure No. 139327/80 dated Oct. 31, 1980 based on patent application No. 47091/79.

BRIEF SUMMARY OF THE INVENTION

The invention provides an apparatus comprising a sizable number of multi-port valves which may be used as a replacement for a rotary valve in a simulated moving bed adsorptive separation process. This apparatus has advantages over other multi-valve apparatus in that the required number of valves is reduced while the purity of the extract is maintained at a high level due to only a minimization of inline mixing of different process streams. For purposes of description the valves used in the apparatus are divided into three tiers or groups. Each tier of valves may be further divided into sets of valves. The first tier of valves has one set of valves for each of the main process streams, such as the feed stream, which enters or leaves the overall apparatus. Each set of these valves is arranged to control the transfer of its corresponding main process stream to or from one of two or more valves connected in parallel and forming a second tier of valves. Each valve of the second tier can transfer the flow of a main process stream between two, or more if desired, valves of a single set of valves of a third tier of valves. In turn each valve of the third tier is in communication with two or more different points within the bed of contact material.

One embodiment of the invention may be characterized as an apparatus for performing a fluid-solids contacting process which comprises a fixed bed of a particulate material which is retained in a fluid-solids contacting zone and which is divided into a number of adjacent sub-beds; at least two inlet main process stream conduits and at least two outlet main process stream conduits; a first tier of multi-port valves, with the first tier of valves comprising a separate set of valves for and in communication with each of the inlet and outlet main process stream conduits, each set of valves of the first tier being arranged such that each but the last valve of the set has one outlet in communication with a hereinafter characterized downstream second tier of multi-port valves and one outlet in communication with another valve of the same set, with the last valve of the set having two outlets in communication with valves of two different sets of valves of said second tier of valves; a second tier of multi-port valves, with the second tier of valves having a plurality of sets of valves comprising two multi-port valves arranged in parallel such that each valve of the same set has an outlet in communication with each of at least two conduits leading to a hereinafter characterized third tier of multi-port valves; and a third tier of multi-port valves, with each valve of the third tier having at least two outlets which are in communication with the fluid-solids contacting zone at points between sub-beds of the contacting zone.

The subject fluid distribution system minimizes both the number of required valves and the length of the conduits which carry more than two of the process streams. The parallel flow arrangement of each set of valves in the second tier of valves allows the separation of the flows through the first tier of valves and interconnecting conduits. For example, the flow of process streams in which a low concentration of raffinate components is desired is handled only by one valve of each set of header valves while the process streams having a high concentration of raffinate components, the feed and raffinate streams, flow through a different header valve of the same set.

Figure 1:
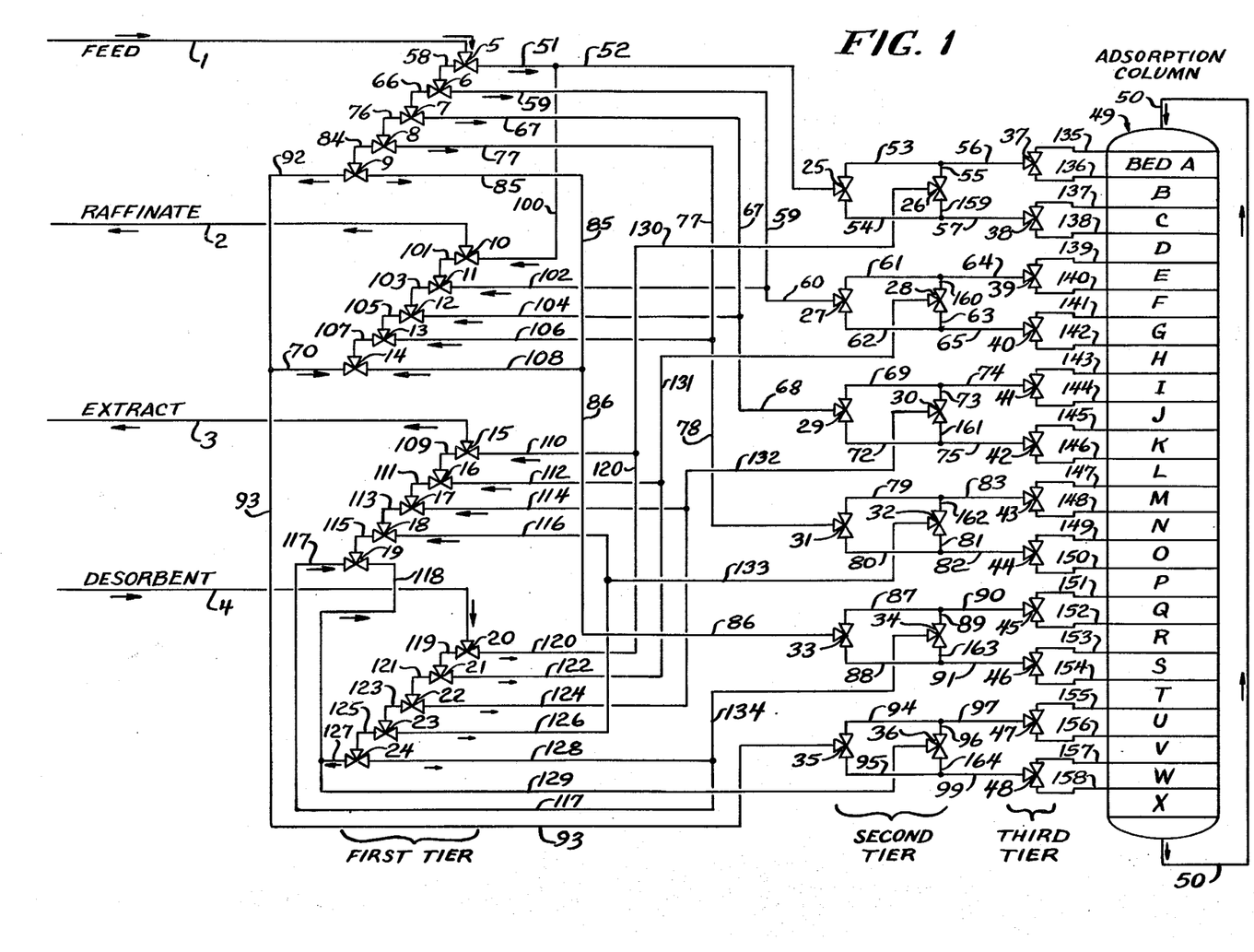
FIG. 1 is a flow diagram of an embodiment of the invention in which three tiers of three-way valves are used to control the flow of the four main process streams carried by lines 1-4 into or out of 24 different points located between beds A to X of a solid adsorbent contained in a single adsorbent column or chanber 49. Most of the detailed description herein is based on this diagram.

Referring now to FIG. 1, each of the 44 three way valves used in the illustrated flow control apparatus are classified for the purposes of description herein as being in one of three different tiers of valves. Valves 5-24 are referred to herein as group valves and are arranged in four sets, one for each of the main process streams. The group valves direct the main process streams to or from one of the valves 25-36, which are referred to as header valves. The header valves are in pairs or sets of two valves each arranged in parallel. The header valves form the second tier of valves. Each header valve is in communication with two of the valves 37-48, which are referred to herein as bedline valves since they are attached to lines leading to the individual adsorbent beds. The bedline valves form the third tier of valves.

The arrows on FIG. 1 indicate the direction of fluid flow in lines which have flow only in one direction. Therefore the fluid flow in lines 70 and 77 or in lines 112, 114, 120 and 122 is only in the direction shown. The flow in all lines connecting group valves of the same set is also unidirectional. For instance, the feed stream flows in a downward direction on the drawing through lines 58, 66, 76, and 84 and the raffinate stream only flows in a generally upward direction on the drawing through lines 107, 105, 103 and 101. The other process lines transport fluids flowing in both directions.

DETAILED DESCRIPTION

The subject invention is an apparatus for individually transferring several fluid streams into and out of different points in a vessel or vessels. The invention could therefore be utilized in a wide variety of the fluids-solids contacting processes in the chemical, petrochemical and food processing industries. It is preferably used when the vessel contains a fixed bed of contact material such as a catalyst, a selective adsorbent or an immobilized enzyme. It is especially preferred that the vessel contains a fixed bed of adsorbent and is arranged to facilitate the simulation of the movement of the adsorbent bed. The fluid streams transferred through the valves and conduits of the apparatus are preferably liquid phase but could be vapor phase.

A highly preferred application of the subject invention is as the flow distribution system for a sorptive separatory process using simulated moving bed techniques. These systems must have a high degree of reliability, which is directly related to the number of individual components having moving parts or parts subject to wear and abrasion. The complexity of a system in terms of the number of valves it requires should therefore be minimized. Holding down the number of valves is also important to minimizing the total cost of the system. Other factors which influence the choice of a valve system are its ease of operation, the number of valves which must be operated at each change in fluid flowpaths and the degree to which the system keeps the different process streams segregated and thus minimizes undesired intermixing of the streams.

It is an objective of the subject invention to provide a multi-valve flow control system which may be used in sorptive separation processes employing simulated moving bed techniques. It is another objective of the invention to provide a highly dependable, reasonable cost flow switching system which utilizes commercially available components and which may be used in such a process. A further objective of the invention is to minimize the number of required valves and the number of required valve movements per step in a simulated moving bed sorptive separation process. An additional objective of the invention is to provide a flow control manifold for use with a simulated moving bed process which minimizes the contamination of product streams caused by admixture with streams containing compounds which are not desired in the product stream.

A complete understanding of the subject apparatus is aided by a knowledge of how the apparatus is used in sorptive separation processes. This is also beneficial in appreciating the various advantages of the apparatus. For these reasons the following brief description of sorptive separation processes is presented.

The separation of various hydrocarbonaceous compounds through the use of selective adsorbents is widespread in the petroleum, chemical and petrochemical industries. Adsorption is often utilized when it is more difficult or expensive to separate the same compounds by other means such as fractionation. Examples of the types of separation which may be performed using selective adsorbents include the separation of ethylbenzene from a mixture of xylenes, unsaturated fatty acids from saturated fatty acids, acyclic olefins from acyclic paraffins, normal paraffins from isoparaffins, and a particular xylene isomer such as paraxylene from a mixture of $C_8$ aromatics. Often, the selectively adsorbed materials have the same number of carbon atoms per molecule as the non-selectively adsorbed materials and have very similar boiling points. Another common application of adsorptive separation is the recovery of a particular class of hydrocarbons from a broad boiling point range mixture of two or more classes of hydrocarbons. An example of this is the separation of $C_{10}$-$C_{14}$ normal paraffins from a mixture which also contains $C_{10}$-$C_{14}$ isoparaffins. The process is also used in the separation of various mono and di saccharides such as the separation of fructose from a mixture of fructose and glucose.

Adsorptive separation processes preferably include the sequential performance of three basic steps. First, the adsorbent must be brought into contact with a feed stream comprising the particular compounds to be collected at adsorption-promoting conditions. This adsorption step should continue for a time sufficient to allow the adsorbent to collect a near equilibrium amount of the preferentially adsorbed compounds. The second basic step is the contacting of the adsorbent while it is bearing both the preferentially and non-preferentially adsorbed compounds with a material which displaces the latter from the adsorbent. The second step is performed in a manner which results in the adsorbent and the interstitial void spaces between adsorbent particles containing significant quantities of only the preferentially adsorbed feed component and the material used to displace the non-preferentially adsorbed compounds. The third basic step of the adsorptive separation process is the desorption of the preferentially adsorbed compounds. This may be performed by changing the conditions of temperature and pressure, but in the simulated moving bed process is performed by contacting the adsorbent with a desorbent stream. The desorbent stream contains a chemical compound capable of displacing or desorbing the preferentially adsorbed compounds from the adsorbent to thereby release these compounds and prepare the adsorbent for another adsorption step. For instance, in the separation of monosaccharides water may be used as the desorbent. Other or different steps could be employed in a different type of adsorptive separation process depending on the feed stock, etc.

Adsorptive separation processes can be operated in several different basic modes. In the simplest mode a single fixed bed of adsorbent is used, and each process stream is in turn passed through the entire bed of adsorbent. This has the advantage of simplicity and low cost, but also has several disadvantages in that it is not a continuous process and that the quantity and purity of the product have not been optimized. These disadvantages can be overcome in part by using several smaller beds, with the flows of the various process streams being rotated through the different beds in a set order. However, this mode does not provide the high purities and other advantages which would be achieved by a true countercurrent process in which the process streams would flow though the adsorbent in the opposite direction to the movement of the adsorbent.

To avoid the problems associated with actual movement of the adsorbent simulated moving bed processes have been developed. In these processes each of the separate steps of a sorptive separation process is performed simultaneously in different parts of a large interconnected bed of adsorbent. Each of these parts is referred to by reference to the step being performed in that area and the adsorbent bed is thus divided into an adsorption zone, a desorption zone and normally other zones such as flush zones and buffer zones. To simulate the movement of the adsorbent the locations of the zones are slowly shifted in unison. At the same time a "pump-around" stream is caused to flow through the entire bed of adsorbent. This stream has a larger flow rate than the process streams added or withdrawn at various points in the adsorbent bed.

The bed of adsorbent used in a separation process may be contained in a single vessel or in two or more interconnected vessels, which are often referred to as chambers. The vessels are preferably vertically aligned although horizontal vessels could potentially be used with vapor phase fluid streams. When it is desired to simulate the movement of the adsorbent the appropriate openings and conduits are provided at a large number of points along the length of the adsorbent bed to allow the addition or withdrawal of each fluid at a large number of different points. At each of these points there is preferably provided a constriction of the cross section of the bed by a liquid distributor-collector. These devices admix fluid flowing through the bed when there is no fluid addition or withdrawal and also admix added fluids into the major flow through the adsorbent. Prior art apparatus for this purpose are shown in U.S. Pat. Nos. 3,208,833, 3,214,247 and 3,523,762. These distributor-collectors serve to aid in the establishment and maintenance of plug flow of the fluids along the length of the cylindrical bed of adsorbent. Such a flow regime is desired to minimize back mixing, which has a detrimental effect on product yields and purity.

The gradual and incremental movement of the adsorption zone, and all other zones utilized in a simulated moving bed process, through the total bed of adsorbent is achieved by periodically advancing the actual points of fluid addition or withdrawal to the next available potential point. This change in the point of fluid transfer will occur at both the leading and trailing edge of each zone. That is, in each advance of a zone, the boundaries marking the beginning and the end of that zone will move by the relatively uniform distance between two adjacent fluid transfer points. The two points at which one of the primary streams, such as the feed or desorbent streams, enters the total adsorbent bed and the corresponding effluent stream leaves the adsorbent bed are preferentially separated from each other by at least two or more potential fluid transfer points which are not being used. For instance, the feed stream may enter the adsorption zone at one point and flow past seven or more potential withdrawal points and through seven distributor-collectors before reaching the point at which it is withdrawn from the adsorbent bed as the raffinate stream. The periodic movement of the feed and withdrawal points of the corresponding streams therefore does not affect the major portion of the primary zones. By the common terminology of the art the entire contents of the process vessel(s) is referred to as the adsorbent bed and the smaller quantities of adsorbent between each of the distributor-collectors is also referred to as a bed of adsorbent. As used herein the term "sub-bed" is intended to indicate these smaller discrete quantities of adsorbent.

The switching of the fluid flows at these many different locations may be achieved through the use of a multi-valve manifold such as the subject apparatus or a multi-port rotary valve. A central digital controller is preferably used to regulate the operation of the rotary valve or manifold. Further details on the operation of a simulated moving bed of adsorbent and the preferred rotary valves may be obtained from U.S. Pat. Nos. 2,985,589; 3,040,777; 3,192,954; 2,957,485; 3,201,491; 3,291,726 and 3,732,325.

Sorptive separation processes can be practiced using any type of commercially operable and practical selective adsorbent. The adsorbent may therefore be a naturally occurring substance or a man-made material and may be in the form of extrudates, pellets or spheres, etc. The adsorbent can be formed from charcoal, alumina, silica or various clays and mixtures of these materials. The preferred adsorbent comprises a shape selective zeolite commonly referred to as a molecular sieve. The term "shape selective" refers to the zeolite's ability to separate molecules according to size or shape because of the fixed and relatively uniform cross sectional diameter of the zeolite's pore structure. The preferred zeolites comprise synthetic crystalline aluminosilicates. Since the pure zeolites are relatively soft and powdery, the commercially used molecular sieves comprise a binder such as clay or alumina to produce a stronger and more attrition-resistant adsorbent particle. The adsorbent particles preferably have a size range of about 20 to about 40 mesh.

The particular adsorbent utilized in a separatory process will depend on the materials which it is desired to separate. For instance, type X or type Y zeolites which contain selected cations chosen from the Group I-A and Group II-A metals may be used to separate xylene isomers. As another example the selective adsorption of olefinic hydrocarbons from saturated hydrocarbons may be performed using a copper exchanged type Y zeolite as described in U.S. Pat. No. 3,720,604. The adsorbents which are preferred for the separation of normal paraffinic hydrocarbons from isoparaffinic hydrocarbons have relatively uniform pore diameters of about 5 angstroms such as commercially available type 5A molecular sieves produced by the Linde Division of Union Carbide Corp. In the particular case of the separation of a ketose from an aldose, it is preferred that a type X zeolite containing a cation chosen from Group II-A of the Periodic Table of Elements is employed as the adsorbent. It is preferred that the cations are chosen from barium and strontium. For the separation of fructose and glucose it is preferred to use a type X zeolite containing a cation pair selected from either barium and potassium or barium and strontium. More details on the separation of monosaccharides using simulated moving bed techniques may be obtained by reference to U.S. Pat. Nos. 4,226,639 and 4,226,977.

The subject apparatus comprises a large number of multi-port valves. As used herein, the term "multi-port valve" is intended to refer to a valve which may be used to selectively direct a fluid stream which enters one port or opening in the valve into one of two or more other ports of the valve. A multi-port valve may therefore be a three-way valve (one inlet, two outlets), a four-way valve, a five-way valve, etc. It is preferred that the multi-port valves of the subject apparatus are three-way valves. The valves may be either ball, plug or globe-type valves. The valves should allow communication between the three ports affected by a switch in valve position during the movement of the valve to minimize problems associated with hydraulic shock. This is a significant potential advantage over valves which are not multi-port valves.

As used herein the term "inlet" is intended to indicate that port of a valve which is normally considered the inlet or common port of the valve based on its mechanical configuration rather than the port which may be receiving the flow into the valve at any one particular point in time. This definition is used to eliminate confusion which may result from the manner in which the valve is used, or from a change in valve position. For instance, the same stream may enter a valve at different ports at different times. The "inlet" is therefore a structural rather than functional term intended to refer to the one port in a valve which may be brought into communication with each other port of the valve while all of the remaining ports are closed to fluid flow. To illustrate this by reference to FIG. 1 of the Drawing, conduit 3 carrying the extract stream out of group valve 15 is connected to the inlet of this valve even though the extract stream flows into the valve through line 109 or line 110. This usage of the term inlet is intended to eliminate confusion as to whether the port connected to line 109 or the port connected to line 110 is "the" inlet of this valve. It also corresponds to the actual usage of the group valves with the feed and desorbent streams which enter the process. It may also be noted by reference to the Drawing that the structural arrangement of the valves is the same for process streams entering or leaving the apparatus.

The arrangement or structure of the apparatus is dependent on a sizable number of variables. Among the more common variables are the type of valves used (three-way vs. four-way, etc.), the desired number of individual beds or sub-beds the adsorption column is divided into, the number of different zones used in the process and the number of different process streams passed into or removed from the process. For instance, if it is desired to also pass an externally produced flush stream into the adsorption column it is easily seen that another set of group valves is required in the first tier of valves by comparing FIGS. 1 and 2. There are, however, certain characteristics of the apparatus which remain despite variation in the process. One of these is that there is a separate set of group valves for each main process stream. Unless otherwise specified, as used herein the terms "main process stream" and "process stream" are intended to refer to streams such as the desorbent stream of line 4 and the feed stream of line 1 rather than streams flowing through intermediate portions of the apparatus such as lines 52 or 99.

Some characteristics of the apparatus are dependent on the use of the same type of valve or a specific type of valve in the apparatus. For instance in the embodiments shown in the Drawing the number of header valves is equal to the number of bed-line valves. This is the same as the second and third tiers of valves having an equal number of valves. This is dependent on all of the valves in both tiers being three-way valves and the fact that each set of header valves contains only two valves. Another characteristic is that when three-way valves are employed then the number of group valves in each set of group valves is equal to one less than the number of sets of header valves. Therefore in the Figures of the Drawing the five group valves of each set branch out to six different sets of header valves.

Another desired characteristic of the preferred embodiment is that one header valve of each set of header valves communicates with two or more sets of group valves carrying main process streams while the other header valve of the same set of header valves only communicates with two or more different sets of group valves carrying two different main process streams. This is illustrated in FIG. 1 in that the group valves carrying the extract stream (valves 15-19) and the group valves carrying the desorbent stream (valves 20-24) are connected to the header valve of each set of header valves shown closest to the adsorption column. In contrast the group valves carrying the feed stream and the group valves carrying the raffinate stream are in communication only with the header valve of each set shown furthest away from the adsorption column. As another example, in FIG. 2 only the feed and raffinate streams are in communication with header valve 197. The main process lines carrying the desorbent, extract and flush streams are only brought into communication with header valve 198.

The identity of the streams which are transferred by group valves in communication with the same header valve is a very important point in the structural arrangement of the apparatus since it influences the quality of the product stream. This is because conduits are used to transport more than one stream in many parts of the system. The components of any stream remaining in a conduit become admixed with the next stream which begins to flow through the conduit. Therefore removing a product stream through a conduit which just previously was used to transport a stream containing compounds which are not desired in the product degrades the product. The degradation is proportional to the volume of commonly used conduit(s). It is normally preferred that the extract stream is admixed with the desorbent stream rather than either the feed stream or the raffinate stream since both of these latter streams contain raffinate components which are not desired in the product stream. The desorbent is normally a chemical compound which is easily separated from the extract compound and contamination of the extract stream with the desorbent is easily removed as by fractionation. It must be remembered if the product of the process is in the raffinate stream rather than in the extract stream then an opposite arrangement would be desired. That is, the nesting configuration of the valve sets is tailored to the zonal configuration within the adsorption column and the desired product.

This characteristic of the apparatus may also be described by the fact that each header valve is in communication with at least two different sets of group valves, and in that each header valve of a set of header valves communicates with different sets of group valves than all other header valves in the same set.

Another characteristic of the invention is that for each but the last group valve of a set, any outlet of a group valve which is not in communication with the inlet of another group valve, as is the left-hand outlet of group valve 5 in FIG. 1, is in communication with the inlet of a header valve. The terminal group valve of a set, such as valve 9, has all of its outlets in communication with header valves of the second tier. This same characteristic would remain if the group valves were four-way valves having three outlets instead of the three-way valves of the Drawing. In this instance two of the outlets would be connected to header valves in all but the terminal valve, which would have its three outlets in communication with three different header valves.

It may also be observed that no two group valves of the same set of group valves are in direct communication with the same set of header valves of the second tier. As used herein the term "direct communication" is intended to indicate that a fluid transfer passageway extends between the two points by means by the conduits employed in the apparatus but that this passageway does not pass through another valve of the same tier of valves. That is, even though liquid could flow in FIG. 1 from group valve 18 to header valve 34 via group valve 19 and line 117, group valve 18 is not in "direct" communication with header valve 34. Valve 34 is only in direct communication with group valves 19 and 24.

The invention may therefore be characterized as an apparatus useful in simulating the movement of solid particles in a fixed particle bed which comprises a first and a second fluid stream inlet conduits and a first and a second fluid stream outlet conduits; a first tier of multi-port valves comprising: (i) a first set of at least four group valves in communication with the first fluid inlet conduit via a first group valve of the first set; (ii) a second set of at least four group valves in communication with the second fluid inlet conduit via a first group valve of the second set; (iii) a third set of at least four group valves in communication with the first fluid outlet conduit via a first group valve of the third set; (iv) a fourth set of at least four group valves in communication with the second fluid outlet conduit via a first group valve of the fourth set; with each but the last group valve of each set having an outlet which is connected to the inlet of another group valve of the same set of group valves; a second tier of multiport valves comprising at least four sets of header valves, with each set comprising a first header valve and a second header valve arranged in parallel, with one valve of each set of header valves having an inlet in communication with the first and the second sets of group valves and with a different valve of each set of header valves having an inlet in communication with the third and fourth sets of group valves; and a third tier of multi-port valves comprising bedline valves attached to conduits communicating with the fixed particle bed at a plurality of points, with each bedline valve having an inlet which is in communication with an outlet of a first header valve and with an outlet of a second header valve of the same set of header valves.

The manner in which the valves are switched to direct the flows of various streams may be discerned by reference to the Drawing together with the following discussion. FIG. 1 illustrates one arrangement for the use of the inventive concept in a separation process in which the use of a moving bed of a selective adsorbent is simulated. In this process a feed stream carried by line 1 and a desorbent stream carried by line 4 are passed into an adsorption column 49 at different points which are periodically moved in the same direction. These two points are chosen from among the 24 inlet conduits or bedlines numbered from 135–158 which allow the passage of fluid streams into the adsorption column or the withdrawal of different fluid streams from the adsorption column.

The feed stream comprises an admixture of at least two different components, one of which is desired to recover in a more highly purified form while the other component or components would be considered impurities in a final product stream. Normally the desired product components are selectively adsorbed onto a solid adsorbent located within the adsorption column, although this need not be the case in all applications. The desorbent stream which enters the process through line 4 functions by displacing or desorbing the previously adsorbed components of the feed stream from the solid adsorbent. The unadsorbed residual components of the feed stream, together with any other compounds such as desorbent acquired during passage through the column are removed from the column as a raffinate stream withdrawn from the process through line 2. The main flow of the desorbent stream together with desorbed compounds is removed from the adsorption column as an extract stream which is carried from the process by line 3. The compounds which were selectively adsorbed are then recovered, if desired, from the extract stream as by fractionation. In some instances, as when a very high purity product is desired, it may be necessary to employ either an internal or external flush stream in the process. This is not shown in FIG. 1 as the inventive concept resides in the structure, arrangement and operation of the valves and conduits used to distribute the various streams rather than in the use of any specific process stream.

As previously stated, the large number of valves employed in the subject apparatus are classified into three distinct groups. The first group, which comprises valves 5–24, is referred to herein as the first tier of valves. The second group which comprises valves 25–36 is referred to herein as the second tier of valves. The third group consisting of valves 37–48 is referred to herein as the third tier of valves. The valves of the first tier are referred to herein as group valves. The valves of the second tier are referred to herein as header valves. The valves of the third tier are referred to herein as bedline valves.

In reviewing the following description of the operation of the process, the following two points will become apparent. The first is that the number of valves which must be operated to switch the flow of four different streams is normally held to four. An additional number of valves, normally three to five in this instance, are also preferably changed at each switching of the flows for the purposes of valve prepositioning and line isolation. This low number of valve changes to actually switch flowpaths is a definite advantage of the subject invention.

A second advantage of the subject invention resides in the manner in which the first tier of valves divides the flow between the proper header valve of the second tier. It will be noted that in all instances the flow of the feed and raffinate streams is directed through the header valves which are shown in the Drawing as being furthest away from the adsorption column. In a like manner, the extract, flush and desorbent streams only flow through those valves of the second tier which are illustrated as being closest to the adsorption column. This results in what may be termed a semidiscrete separation of the extract and raffinate streams, and significantly increases the purity of the extract stream. That is, only the relatively short lines or conduits connecting the adsorption column to the header valve carries all four fluid streams of the process. This embodiment of the invention thereby provides separate upstream (first and second tier) switching systems for the flow of the feed and raffinate streams as compared to the extract and desorbent streams. This arrangement is preferred when the extract stream carries the desribed product compound of the process, but if the raffinate stream contains the desired product compound, that compound which it is desired to obtain in a higher degree of purity, then it is desired that the desorbent and raffinate streams share a common upstream flow diversion system and that the feed and desorbent streams also share a common upstream flow diversion system.

Another characteristic of the subject invention relates to the number of different process streams which flow through each of the three types of valves. Only a single process stream flows throught the valves of each set of group valves. In comparison, each header valve handles the flow of two different process streams and all four process streams flow through each of the bedline valves. Therefore, only the desorbent flows through lines 119, 121, 123, 125 and 127 and only the extract stream flows through lines 109, 111, 113, 115 and 117. The header valves 26, 28, 30, 32 and 34 receive both the desorbent stream and the extract stream. Each of the bedline valves 37–48 receives these two streams and also the feed and raffinate streams.

The following paragraph describes the flows through the apparatus shown in FIG. 1 when the feed stream is passed into the topmost bed of adsorbent labeled Bed A in the Drawing. The feed stream enters the process through line 1 and is directed through group valve 5 into lines 51 and 52. The feed stream then passes through valve 25 into lines 53 and 56 before entering valve 37 which directs the flow of the feed stream through line 135 into the top of Bed A. A raffinate stream comprising unadsorbed components of the feed stream is removed from the adsorption column through line 141 and directly by valve 40 into line 65. The raffinate stream then flows through line 62, valve 27, and lines 60 and 102 into valve 11. From valve 11 the raffinate stream flows through line 101 into valve 10 and is removed from the process through line 2. The desorbent stream enters group valve 20 from line 4 and is directed through line 119 into valve 21 and from there into line 121 to valve 22. The desorbent stream then flows through line 124 into line 132 and valve 30. Header valve 30 directs the desorbent stream through lines 73 and 74 into the bedline valve 41 which causes the desorbent stream to enter the adsorption column through line 144. An extract stream comprising a portion of the desorbent stream and desorbed compounds where were removed from the adsorbent, is removed from the adsorption column through line 150 at the bottom of Bed O. The extract stream flows into valve 44, line 82 and line 81. The extract stream then flows through valve 32, line 133, line 116, valve 18, line 113, valve 17, line 111, valve 16, line 109, and valve 15 before being withdrawn from the process through line 3.

The following paragraph describes the flowpath of the four process streams at a subsequent point in time at which the point of transfer of each process stream is at the next lower bed in the adsorption column as compared to the previous paragraph. The feed stream once again enters the process through line 1 and flows through valve 5 into lines 51 and 52 before entering valve 25 and line 53. However, as the feed stream enters valve 37 from line 56, it is caused to flow into line 136 and enters the adsorption column at the top of Bed B. The raffinate stream is withdrawn from the adsorption column bedline 142 at the bottom of Bed G and flows into valve 40, line 65, line 62 and then into valve 27. The raffinate stream then continues through lines 60 and 102, valve 11, line 101, valve 10 and finally exits the process through line 2. The flowpath of the feed stream and the raffinate stream therefore differs from the immediately preceding paragraph only by flowing through a different bedline and by entrance into what is illustrated as the lower port of the respective bedline valves. The desorbent stream enters the process as before through line 4 and again passes through valve 20 into line 119 and valve 21. The desorbent stream then flows through line 121, valve 22, line 124, line 132, valve 30 and line 161. The desorbent stream then flows through line 75 into valve 42 which directs the desorbent stream into bedline 145 at the bottom of bed J. The extract stream is removed from the adsorption column in bedline 151 and passed into valve 45 which directs the extract stream into line 90. It then continues through line 89, valve 34, line 134 and line 117 which feeds the extract stream into the first tier of valves. The stream then flows through valve 19, line 115, valve 18, line 113, valve 17, line 111, valve 16, line 109 and valve 15 before leaving the process through line 3.

The following paragraph describes the flow of the four process steams when the transfer point of each process stream has been moved down by one more bed than the previous paragraph. That is, the feed stream flows through line 52 into valve 25 which directs the flow of the feed stream through lines 54 and 57 into valve 38. The feed stream then enters the adsorption column 49 through bedline 137. The raffinate steam is removed from the adsorption column through bedline 143 and flows through valve 41, line 74, line 69 and then enters the header valve 29. The desorbent stream enters the adsorption column via line 75, valve 42 and line 146. The extract stream is removed from the adsorption column through line 152 which transfers this stream into valve 445 for passage through line 90. The portion of the flow of each of the four streams not described in this paragraph is the same as that described in the immediately preceding paragraph.

The following paragraph is a description of the flows of the four main process streams when the feed stream is entering the fourth bed of the adsorption column, which is labeled Bed D in the Drawing. At this stage in the progression of the various feed and withdrawal points downward through the adsorption column, the feed stream now enters the adsorption column through line 138 instead of line 137 which was used at the previous feed point. The raffinate stream is withdrawn from the adsorption column through line 144 at the bottom of Bed I and passed into the valve 41. The change of the respective feed and withdrawal points of the feed and raffinate streams therefore required only the operation of the bedline valves 38 and 41. The desorbent stream again enters the process through line 4 and passes downward through the Drawing through valve 20, line 119, valve 21, line 121, valve 22, line 123 and valve 23. The desorbent stream then passes through lines 126 and 133 before entering the header valve 32 which transfers the desorbent stream into line 162. The desorbent stream then flows through line 83, valve 43 and line 147 before entering the adsorption column. The corresponding extract stream is removed from the adsorption column through bedline 153 and passed into line 91 through valve 46. This stream then flows through line 163, valve 34, line 134, line 117 and valve 19. The extract stream is then channeled through valves 18, 17, 16 and 15 and the interconnecting lines before leaving the process through line 3.

This paragraph describes process flows of the same embodiment of the invention when the feed stream is passed into the top of Bed E of the adsorption column 49. The feed stream entering the process through line 1 is channeled by valve 5 through line 58 into valve 6 which directs the flow of the feed stream into line 59. The feed stream then flows through line 60 into header valve 27 and lines 61 and 64 which direct the feed stream into the bedline valve 39. The feed stream then enters the adsorption column through line 139 and flows downward through the adsorption column. The raffinate stream is withdrawn from the adsorption column at the bottom of Bed J through line 145 and passed into the bedline valve 42. The raffinate stream then travels through lines 75, 72 and 68 via valve 29 before entering line 104. The raffinate stream then continues through valves 12, 11 and 10 before leaving the process through line 2. The desorbent stream enters the process through line 4 and is channel via valves 20, 21, 22 and 23 and the interconnecting lines into line 126. The desorbent stream then flows into line 133, valve 32, line 162 and line 83. The desorbent stream then enters valve 43 which directs it through line 148 for entrance into the adsorption column at the top of Bed N. The extract stream is withdrawn at the bottom of Bed S via line 154 and passed through valve 46 into lines 91 and 163. The extract stream then flows through valve 34 into line 134 which carries it to line 117. The extract stream then flows through valves 19, 18, 17, 16 and 15 into line 3.

This paragraph describes the preferred flow of the four process streams when the feed stream enters the top of Bed F of the adsorption column. The feed stream which previously was flowing through line 139 is now diverted into line 140 by a change in valve 39. The feed stream reaches valve 39 in the same manner as described in the paragraph above. By changing valve 42, the raffinate stream is now withdrawn through line 146 instead of line 145. The remainder of the flow of this stream is also the same as in the immediately above paragraph. The desorbent stream which was previously flowing through line 162 is now caused to flow into line 81 by a change in valve 32. The desorbent stream then enters line 82 and valve 44 which directs the desorbent stream into line 149 for passage into the adsorption column at the top of Bed O. The extract steam is now withdrawn from the adsorption column through line 155 and passed through valve 47, line 97, line 96, valve 36 and line 129. The extract stream then enters line 118 and flows through valves 19, 18, 17, 16 and 15 before being removed from the process through line 3.

In a manner similar to that set out in the paragraph above, the flow of each of the four streams may be rotated to any one of the 24 bedlines. For instance, when it is desired to pass the feed stream into the ninth bed in the adsorption column, which is labeled Bed I, the feed stream would flow through valves 5, 6 and 7 before entering line 67. The feed stream would then flow through line 68 and valve 29 into line 69. The feed stream then continues through line 74 into valve 41 and line 143. The raffinate stream would in this instance be withdrawn from the adsorption column through line 149 and passed through valve 44 into line 82. The raffinate stream would then flow through line 80, valve 31, line 78 and line 106. The raffinate stream would then continue through valves 12, 12, 11 and 10 and the interconnection lines before leaving the process through line 2. The desorbent stream which is fed to the process through line 4 would pass through valves 20–24 before entering line 128. The desorbent stream would then flow through line 134, valve 34, line 89 and line 90. Valve 45 would then direct the desorbent stream into the adsorption column through line 152. The extract stream is removed through line 158 at the bottom of Bed W and transferred into valve 48. It then flows through lines 99 and 164 into the header valve 36 which directs the extract stream into line 129. The extract stream then flows through line 118 into the group valve 19 and the subsequent group valves 18, 17, 16 and 15 before being removed from the process in line 3.

This paragraph describes the flowpath taken by the four process streams in the same embodiment of the invention (FIG. 1) when the feed stream is passed into the top of Bed J. The feed steam enters the process through line 1 and passes through group valves 5, 6 and 7 before entering line 67. The feed stream then continues through line 68 into header valve 29 and line 69. The feed stream then passes through line 74, valve 41 and line 144. The raffinate stream is removed from the adsorption column through line 150 and passed through bedline valve 44, lines 82 and 80 and header valve 31. The raffinate stream then flows through lines 78 and 106 before passing through group valves 13, 12, 11 and 10. The desorbent stream enters the process through line 4 and flows through group valves 20–24 of the first tier before entering line 128. The desorbent stream then flows through line 134 and header valve 34 before entering line 163. The desorbent stream then enters the adsorption column through line 91, valve 46 and line 153. The extract stream is removed at the top of Bed A through line 135 and flows through valve 37, lines 56 and 55, valve 26 and line 130. The extract stream then flows through line 110, group valve 15 and leaves the process in line 3.

To insure a proper understanding of the invention and the method in which the various streams would flow through the preferred embodiment shown in the Drawing, the following examples of alternative flows of the feed and raffinate streams are presented in this paragraph. For instance, if it is desired to withdraw the raffinate stream through line 151 at the bottom of Bed P, then the raffinate stream would flow through valve 45, lines 90 and 87, valve 33, lines 86 and 108, the group valves 14–10 and the interconnecting lines including line 107 before leaving the process through line 2. If it is desired to pass the feed stream into the adsorption column at the same point through line 151, then the feed stream would pass downward through group valves 5–9 and the interconnecting lines including lines 76 and 84 to then flow through lines 85 and 86 for passage through valve 33 into lines 87 and 90. If instead it is desired to pass the feed stream into a lower bedline such as line 156, the feed stream would flow through line 92 and line 93 into valve 35 and line 94 for connection with line 97 and line 156.

The switching of the position of the various valves is preferably controlled by a digital computer or similar automated control means. The number and location of valves which must be switched will be dependent on the structure of the apparatus. The following discussion is therefore based on the embodiment of the apparatus shown in FIG. 1 of the Drawing. In this embodiment it is normally desired to switch the position of either seven to nine valves for each step of all four fluid streams into the next lowest bedline position. These valves comprise four valves which are changed to redirect flows and from three to five valves which are changed to provide isolation or to prepare for the next step in the use of the apparatus, which is also referred to herein as prepositioning of the valves. It should be noted that as the flowpoint of each of the different streams descends through the chamber, it is always the lowest of the two bedlines serviced by each bedline valve which last transports the stream. It is therefore necessary to at least reset each of the bedline valves to direct flow into the upper bedline prior to the next use of that pair of bedlines.

The term isolation is used herein to refer to both the closing of a valve port to prevent flow through a conduit and the closing of a valve port to seal off an open end of a conduit through which a process stream cannot flow due to a different valve already being closed. The latter practice is designed to minimize mixing of the contents of the two different conduits at their junction due to a flow in one of the conduits. The latter isolation method results in both ends of a conduit being sealed.

The following description of the switching of the valves corresponds to the prior description of the flows through various parts of the apparatus of FIG. 1. To switch the various flows when the feed stream is changed from bedline 158 to bedline 135 and into sub-bed A it was necessary to switch group valve 5 to direct the feed stream into line 51. It was also necessary to switch header valve 27 to redirect the flow of the raffinate stream. Bedline valve 41 was switched to block line 143 and open line 144 to the flow of the desorbent stream. The flowpath of the extract stream was changed by switching valve 44 to block line 149 and open line 150. Header valve 28 was switched to block line 63. Bedline valves 39 and 46 were also switched to close lines 140 and 154.

To shift the feed stream inlet point down to the top of sub-bed B and to make the corresponding changes in the other streams the following valve position changes are made. The bedline valve 37 is switched to open line 136 and close line 135 to liquid flow. The raffinate stream flow is switched by changing bedline valve 40 such that line 141 is closed and line 142 is opened to liquid flow. Header valve 30 is switched to allow the desorbent stream to flow through line 161, with bedline valve 41 closing line 144. The extract stream is rerouted by switching group valve 18 to close line 116 and open line 115. Valve 19 was previously set to prevent flow into line 117. To prepare the apparatus, header valve 29 is moved to close line 72 to liquid flow, header valve 31 is moved to block line 79, header valve 32 is switched to block line 81, and bedline valve 44 is switched to block line 150.

In the next step in the process header valve 25 is switched to open line 54 to the flow of the feed stream and to block liquid flow through line 53. Group valve 11 is switched such that the raffinate stream flows from line 103 into line 101. Bedline valves 42 and 45 also are switched to block lines 145 and 151 respectively and switch the flows of the desorbent and extract streams. Header valves 26, 27 and 28 are also switched at this time to block flowpaths through lines 159, 62 and 160 respectively. In addition bedline valve 47 is switched to close line 156 to fluid flow. The valve positioning changes which occur during the use of the apparatus do not interrupt the circulation of the pump around stream flowing through line 50. These descriptions of various routings and switching sequences have been presented as an illustration of the use of the apparatus and have not included a full cycle in the movement of the process flows through the adsorption column 49. However, this teaching may be extended by analogy to cover other situations including the use of such lines as 88, 95 and 100.

Figure 2:
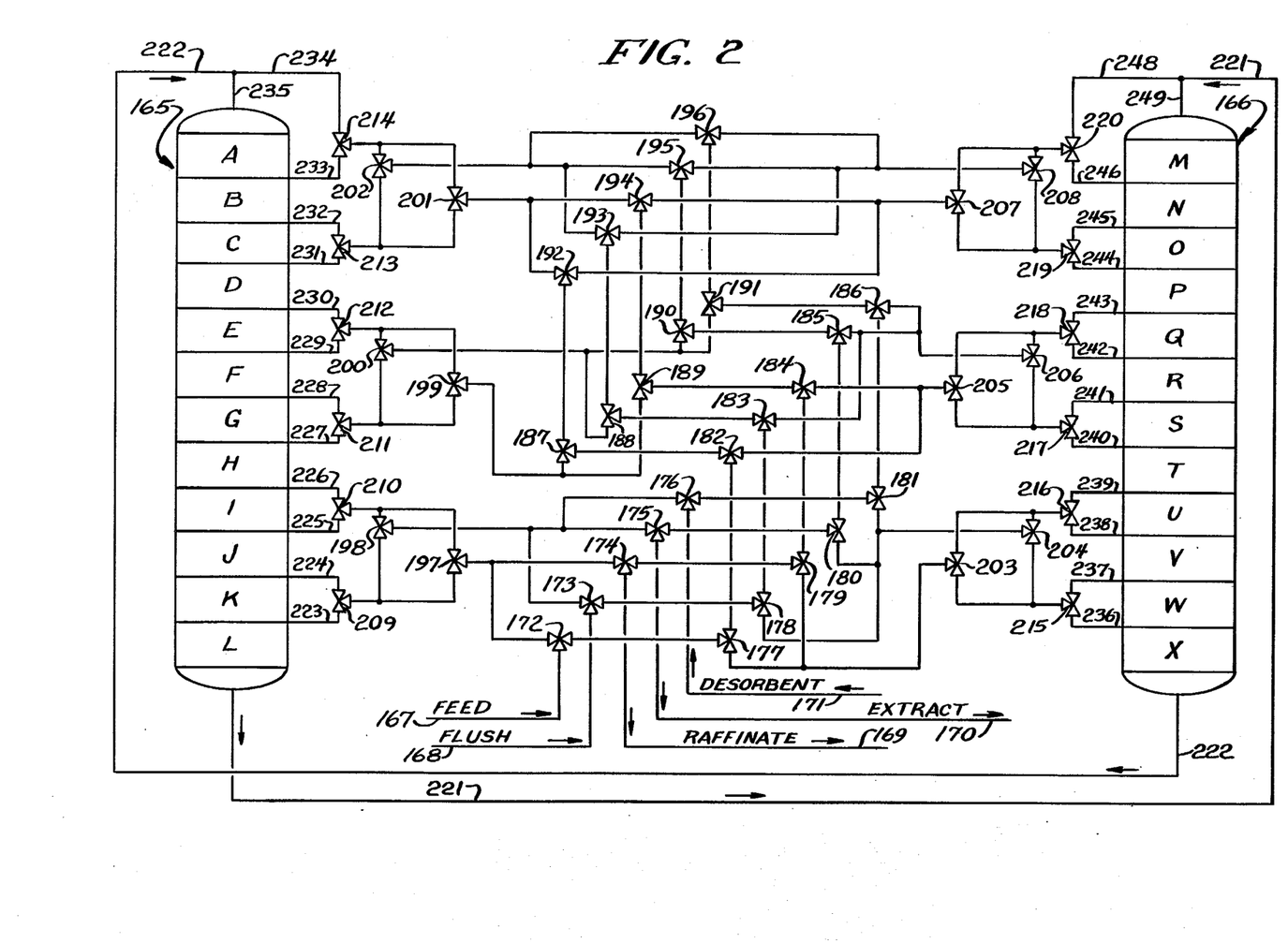
FIG. 2 is a flow diagram showing the use of three tiers of valves to control the flow of five process streams when the 24 beds of adsorbent A to X are contained in two separate chambers. The "nesting" of the group valves is different than that in FIG. 1 to better fit the parallel two chamber adsorbent system.

The apparatus of FIG. 2 differs from that of FIG. 1 in several ways other than that the adsorbent sub-beds A-X are located in two separate chambers 165 and 166. This embodiment also differs in that five separate main process streams are employed due to the addition of a line flush stream entering through line 168. The feed stream enters through line 167, and the raffinate, extract and desorbent streams are carried by lines 169, 170 and 171 respectively. The five main process streams result in there being five sets of group valves. These valves are "nested" as in FIG. 1. The first set comprises valves 172, 177, 182, 187 and 192 and the second set is formed by group valves 173, 178, 183, 188 and 193. Group valves 174, 179, 184, 189 and 194 form a third set of group valves. Valves 175, 180, 185, 190 and 195 and group valves 176, 181, 186, 191 and 196 form the fourth and fifth sets of group valves respectively. These thirty valves labeled 172-196 form the first tier of valves in this embodiment of the invention.

The twelve header valves 197-208 are arranged in parallel sets of two valves each. These valves once again form the second tier of valves. The twelve bedline valves 209-220 form the third tier of valves. The arrangement of the header valves and bedline valves is the same as in previously described FIG. 1. Two connecting lines 221 and 222 are required to tie the ends of the two chambers together as needed for the flow of the process materials and the pump around stream. Bedlines 223 to 234 to 248 together with lines 235 and 249 complete the connection between the valving system and the adsorbent chambers. The lines used to connect the valves are not identical to those used in FIG. 1, with the differences extending beyond those required to accommodate the additional valves.

Since this embodiment requires a total of 49 three way valves, has different interconnections and handles an additional process stream the operation of the valves to switch the flow of the process streams is not identical to that of the embodiment of FIG. 1. However, the overall operation and operating principles are the same. For instance to reach one of the beds I to L the feed stream flows through line 167, group valve 172 into header valve 197 and then to either bedline valve 209 or 210. For the feed stream to flow into beds A to D it is directed by group valve 172 into group valve 177. From there the feed stream flows through group valve 182, 187 and 192 before entering header valve 201 for routing to bedline valve 213 or 214. It should be noted that other routes may also be employed.

The embodiment of FIG. 2 is normally preferred for use with two parallel chambers of adsorbent. It offers the advantage of reducing the total distance traveled by the process streams though the conduits when the zones of the adsorption process are in certain locations within the chambers. Still other arrangements of the valves and conduits of the subject invention may be preferred with other adsorbent configurations such as the use of three or more chambers or if the chambers are not at the same elevation.

Figure 3:
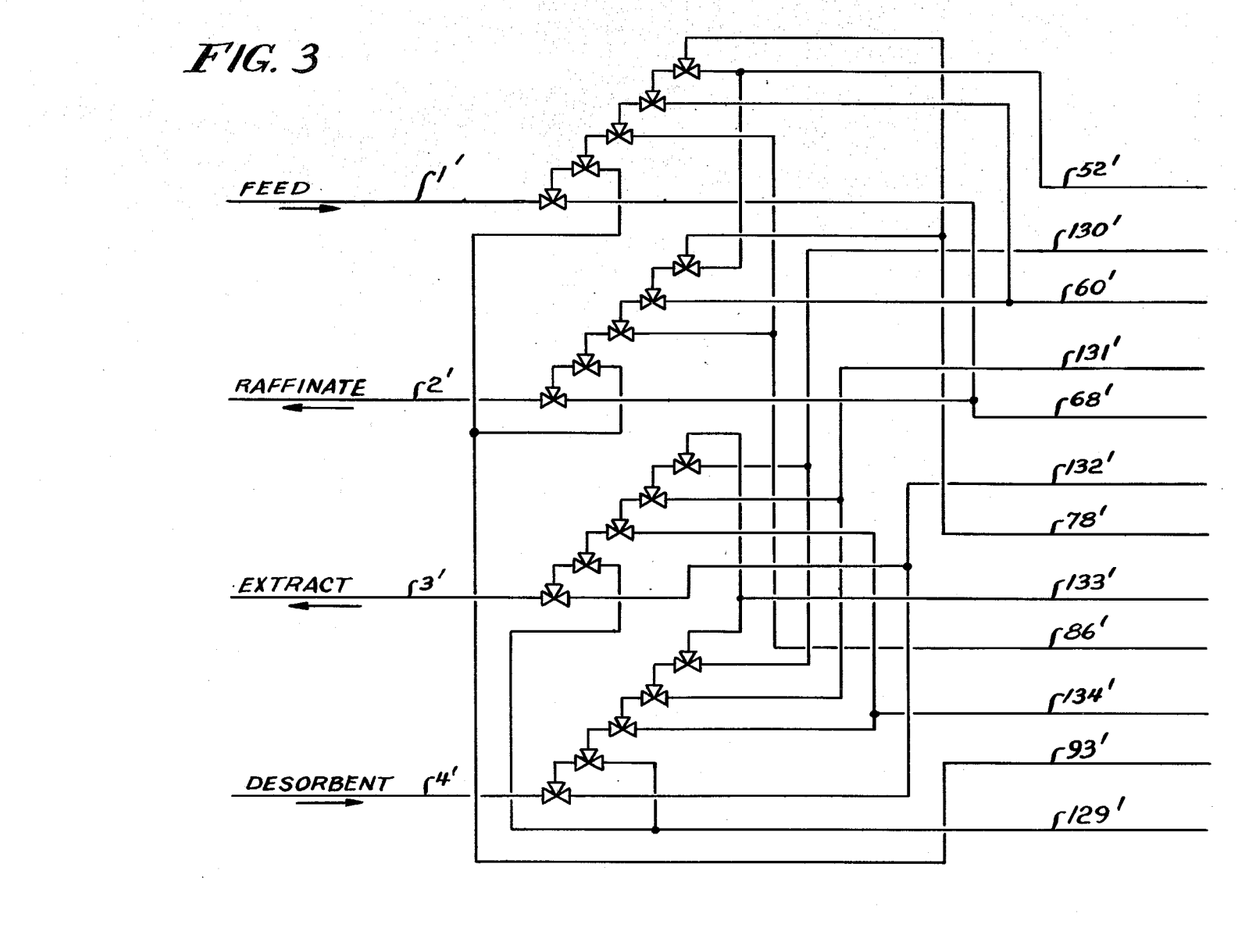
FIG. 3 shows a valve arrangement similar in nature to FIG. 2 but used to carry only four process streams into the single adsorbent column of FIG. 1.

FIG. 3 illustrates another embodiment of the invention used with the single adsorbent chamber of FIG. 1 and which switches the flow of only the four main process streams of FIG. 1. The adsorbent chamber, bedline valves and header valves are not shown since they are identical to those shown in FIG. 1. The "nesting" of the group valves is however different. In this embodiment, the main process streams flow through conduits 1', 2', 3' and 4' which are connected to what is shown as the bottom valve of each set of group valves. The interconnection of the valves and the connections between the group valves and the header valves are significantly changed but follow the same operating principle and design philosophy as set out above. Therefore, only the raffinate and feed streams flow through lines 52', 60', 68', 78', 86' and 93' which would connect to the "left-hand" or outer header valves of FIG. 1. In a similar manner the corresponding right-hand header valve of the sets illustrated in FIG. 1 would connect to lines 130', 131', 132', 133', 134' and 129'. These last mentioned six lines would transport only the extract and desorbent streams.

I claim as my invention:

1. An apparatus for performing a fluid-solids simulated moving-bed contacting process which comprises:
   (a) a fixed bed of a particulate material which is retained in a fluid-solids contacting zone and which is divided into a number of adjacent sub-beds;
   (b) at least two inlet main process stream conduits and at least two outlet main process stream conduits;
   (c) a first tier of multi-port valves, with the first tier of valves comprising a separate set of valves for each of the inlet and outlet process stream conduits, the first valve in each set of valves of said first tier having a port in communication with said associated main process stream conduit, each set of valves of the first tier being arranged such that each but the last valve of the set has one port in communication with a hereinafter characterized downstream second tier of multi-port valves and one port in communication with another valve of the same set, with the last valve of the set having two ports in communication with valves of two different sets of valves of said hereinafter characterized second tier of valves;
   (d) a second tier of multi-port valves, with the second tier of valves having a plurality of sets of valves comprising two multi-port valves arranged in parallel such that each valve of the same set has a port in communication with each of at least two conduits leading to a hereinafter characterized third tier of multi-port valves; and,
   (e) a third tier of multi-port valves, with each valve of the third tier having at least two ports which are in communication with the flud-solids contacting zones at points between sub-beds of the contacting zone.

2. The apparatus of claim 1 further characterized in that each valve is a three port valve.

3. The apparatus of claim 2 further characterized in that the first tier of valves comprises four sets of valves.

4. The apparatus of claim 3 further characterized in that the second tier of valves comprises six sets of valves.

5. The apparatus of claim 4 further characterized in that the fixed bed of particulate material is divided into 24 sub-beds.

6. The apparatus of claim 3 further characterized in that each set of valves in the first tier of valves has five valves.

7. The apparatus of claim 1 further characterized in that the first tier of valves comprises five sets of valves.

8. The apparatus of claim 1 further characterized in that the fixed bed of particulate material is divided into at least 8 sub-beds.

9. An apparatus useful in a simulated moving-bed sorptive separation process which comprises:
   (a) a fixed bed of a solid adsorbent retained in a fluid-solids contacting zone and divided into a number of sub-beds, with a separate conduit providing means for fluid addition and withdrawal between each sub-bed;
   (b) a first tier of multi-port valves comprising a plurality of sets of group valves, each set of group valves being in communication with a different process stream conduit which is connected to the inlet of one of the group valves, each but the last of the group valves of each set being in communication with the inlet of another group valve of the same set of group valves and also in communication with a header valve of a hereinafter characterized second tier of valves;
   (c) a second tier of multi-port valves comprising a plurality of header valve sets comprising a first header valve and a second header valve arranged in parallel, with the inlet of the first header valve being in communication with a first set and a second set of said group valves and with the inlet of the second header valve being in communication with a third set and a fourth set of said group valves; and,
   (d) a third tier of multi-port valves comprising bedline valves having at least two outlets which are attached to said conduits providing means for fluid addition and withdrawal between each sub-bed, with the inlet of each bedline valve being in communication with an outlet of a first and a second header valve.

10. The apparatus of claim 9 further characterized in that there are four sets of group valves.

11. The apparatus of claim 9 further characterized in that the valves are three port valves.

12. The apparatus of claim 11 further characterized in that the two outlets of each header valve of the second tier of valves are in communication with two different bedline valves of the third tier of valves.

13. The apparatus of claim 9 further characterized in that each outlet of a group valve which is not in communication with the inlet of another group valve is in communication with the inlet of a header valve of the second tier of valves, and in that no two group valves of the same set of group valves are in direct communication with the same set of header valves of the second tier of valves.

14. The apparatus of claim 13 further characterized in that there are four sets of group valves.

15. The apparatus of claim 9 further characterized in that the fixed bed of adsorbent is divided into at least 8 sub-beds.

16. An apparatus useful in simulating the movement of solid particles in a fixed particle bed which comprises: (a) a first and a second fluid stream inlet conduits and a first and a second fluid stream outlet conduits;
(b) a first tier of multi-port valves comprising:
 (i) a first set of at least four group valves in communication with the first fluid inlet conduit via a first group valve of the first set;
 (ii) a second set of at least four group valves in communication with the second fluid inlet conduit via a first group valve of the second set;
 (iii) a third set of at least four group valves in communication with the first fluid outlet conduit via a first group valve of the third set;
 (iv) a fourth set of at least four group valves in communication with the second fluid outlet conduit via a first group valve of the fourth set; with each but the last group valve of each set having an outlet which is connected to the inlet of another group valve of the same set of group valves;
(c) a second tier of multi-port valves comprising at least four sets of header valves, with each set comprising a first header valve and a second header valve arranged in parallel, with one valve of each set of header valves having an inlet in communication with the first and the second sets of group valves and with a different valve of each set of header valves having an inlet in communication with the third and the fourth sets of group valves; and,
(d) a third tier of multi-port valves comprising bedline valves attached to conduits communicating with the fixed particle bed at a plurality of points, with each bedline valve having an inlet which is in communication with an outlet of a first header valve and an outlet of a second header valve of the same set of header valves.

17. The apparatus of claim 16 further characterized in that there is an equal number of header valves and bedline valves.

18. The apparatus of claim 16 further characterized in that all of the valves are three port valves.

19. The apparatus of claim 16 further characterized in that each set of group valves comprises five group valves.

20. The apparatus of claim 16 further characterized in that each set of group valves has a terminal group valve having two outlets, each of which is in communication with an inlet of two different header valves.

21. The apparatus of claim 16 further characterized in that the number of group valves in each set of group valves is equal to one less than one-half the total number of bedline valves.

22. The apparatus of claim 21 further characterized in that the apparatus contains 44 three-port valves and has conduits communicating with the fixed particle bed at 24 locations.

23. The apparatus of claim 16 further characterized in that there are five sets of group valves and in that the total number of fluid stream inlet conduits and fluid stream outlet conduits is equal to five.

24. The apparatus of claim 16 further characterized in that the solid particles comprise an adsorbent.

25. The apparatus of claim 16 further characterized in that the fixed particle bed is divided into at least 8 sub-beds.

26. The apparatus of claim 16 further characterized in that the number of group valves in each set of group valves is equal to one less than the number of sets of header valves.

* * * * *